United States Patent [19]

Lanza et al.

[11] Patent Number: 4,973,846
[45] Date of Patent: Nov. 27, 1990

[54] LINEAR RADIATION DETECTOR

[75] Inventors: Richard C. Lanza, Brookline; Joseph R. Votano, Tewksbury, both of Mass.

[73] Assignee: Expert Image Systems, Inc., Somerville, Mass.

[21] Appl. No.: 322,085

[22] Filed: Mar. 10, 1989

[51] Int. Cl.$^5$ .............................................. G01T 1/185
[52] U.S. Cl. ................................. 250/385.1; 250/374
[58] Field of Search ............................ 250/385.1, 374

[56] References Cited

U.S. PATENT DOCUMENTS

| | | | |
|---|---|---|---|
| 3,891,851 | 6/1975 | Fletcher et al. | 250/385.1 |
| 4,031,396 | 6/1977 | Whetten et al. | 250/385 |
| 4,129,783 | 12/1978 | Houston | 250/445 |
| 4,485,307 | 11/1984 | Osborne et al. | 250/385 |
| 4,613,313 | 9/1986 | Steele | 445/28 |
| 4,613,314 | 9/1986 | Steele | 445/28 |
| 4,859,855 | 8/1989 | Vlasbloem | 250/385.1 |

*Primary Examiner*—Janice A. Howell
*Assistant Examiner*—Richard Hanig

*Attorney, Agent, or Firm*—Thomas J. Engellenner; David A. Jacobs

[57] ABSTRACT

Radiation detection methods and apparatus measure ionizing radiation propagating from a radiation source, utilizing a chamber having an electrically conductive sheet, an electrode assembly spaced apart from the conductive sheet and segmented into a plurality of electrically discrete electrode segments, and an ionizable medium disposed between the electrode assembly and conductive sheet, for absorbing the ionizing radiation and generating charged particles in proportion to the radiation energy absorbed. An electrical potential can be provided between the electrode assembly and conductive sheet, so that respective electrode segments collect the charged particles. Elements are provided for comparing the number of charged particles collected on respective electrode segments, to provide a measure of the energy distribution of the ionizing radiation, and for compensating for changes in capacitance or electrical potential between the electrode segments and the electrically conductive sheet elements.

30 Claims, 6 Drawing Sheets

LINEAR RADIATION DETECTOR

BACKGROUND OF THE INVENTION

This invention relates generally to methods and apparatus for detection of radiation, and, more particularly, relates to radiation detectors useful in bone densitometry, for generating data representative of ionizing radiation absorption along a plurality of ray paths.

Bone densitometry is a technique for measuring the bone mineral content (BMC) of bones to detect bone loss and thereby diagnose certain disease states. Typically, bone densitometry systems employ an ionizing radiation source—such as an X-ray or radioisotope source—and one or more detector elements. The portion of a patient's body to be evaluated is placed between the source and the detector elements. When rays generated by the source pass through the body and impinge upon the detector elements, the detectors produce electrical signals representative of the density and amount of bone material in the region between the source and the detectors. Systems of this sort are well known in the art. See, for example, Cameron and Sorenson, *Science,* Vol. 142, p. 230 (1963) and *Osteoporosis Update* 1987, H. K. Genant, ed.

Conventional bone densitometry systems, however, suffer from a number of deficiencies. In most bone densitometry systems, a single source and single detector are employed. As a result, only a small fraction of the source output is intercepted by the detector, and a large, cumbersome and expensive X-ray tube or radioisotope source is required to effect rapid and precise measurements.

It is thus an object of the invention to provide detection methods and apparatus which can provide rapid, precise radiation detection without attendant bulk, complexity, and expense.

Certain conventional bone densitometry systems implement area measurements by mechanically scanning the source and detector in a raster pattern over the region to be measured. Motion of the patient during this time results in a blurred and imprecise image. It has also been proposed in prior art to replace the single detector with a line of detectors and thus to measure a single line in the body simultaneously. Measurement over the area is then obtained by motion in a single axis, by translating the detection line across the area to be scanned. This technique increases scanning speed, thereby decreasing patient motion effects. Additionally, the portion of source output which is intercepted by the detectors is greatly increased, so that the total output and attendant cost of the source can be reduced without increasing scan time. However, certain line detectors typical of the prior art utilize expensive solid state silicon or germanium detector arrays which are not generally available commercially. Other such systems employ scintillation crystals, such as sodium iodide, coupled to relatively complex and expensive photomultiplier tubes or photodiodes.

It is accordingly a further object of the invention to provide a linear radiation detector which is simple and inexpensive to construct and employ.

Another configuration of bone densitometry system utilizes multiple ionization detector chambers constructed by placing conductive electrodes in an ionizable gas medium. Such arrays have been employed in the detection of radiation for X-ray tomographic systems Devices of this type are disclosed in U.S. Pat. Nos. 4,031,396 and 4,129,783. The precision of these systems, however, is significantly degraded by physical disturbances such as mechanical vibration. In addition, these systems have no provision for determining the energy spectrum or distribution of the detected X-rays, a critical step in accurate determination of BMC values.

It is therefore an object of the invention to provide radiation detection methods and apparatus which generate high Precision measurements of ionizing radiation, with relative insensitivity to mechanical vibration.

It is yet another object of the invention to provide such methods and apparatus which facilitate determination of the energy distribution of the radiation.

SUMMARY OF THE INVENTION

The foregoing objects are attained by the invention, which provides methods and apparatus for detecting ionizing radiation propagating from a radiation source, utilizing a chamber having an electrically conductive sheet, an electrode assembly spaced apart from the conductive sheet and segmented into a plurality of electrically discrete electrode segments, and an ionizable medium disposed between the electrode assembly and conductive sheet, for absorbing the ionizing radiation and generating charged particles in proportion to the radiation energy absorbed. An electrical potential can be provided between the electrode assembly and conductive sheet, so that respective electrode segments collect the charged particles.

In another aspect of the invention, the electrode assembly and the conductive sheet are oriented parallel to the direction of propagation of the ionizing radiation, and the electrode assembly is divided linearly in a first dimension parallel to the direction of propagation of the ionizing radiation, to form rectilinear segments. Alternatively, the assembly can be divided radially, so that the segments are radial segments having a major axis oriented toward the radiation source. Each segment, in turn, is divided in a second dimension, substantially perpendicular to the direction of propagation of the ionizing radiation, to form electrically discrete electrode sub-segments. The electrode sub-segments can be formed on a printed circuit board, and can have a size and collective configuration which limits the solid angle through which the ionizing radiation can interact with the ionizable medium.

The invention further includes methods and apparatus for measuring and comparing the number of charged particles collected on respective electrode sub-segments in each segment, to provide a measure of the energy distribution of the ionizing radiation. This comparison can utilize differential amplifier, charge integrator and analog shift register elements, for detecting, amplifying, storing and transmitting signals representative of the number cf charged particles collected by respective sub-segments in each segment. These elements can be incorporated into an integrated circuit.

Another aspect of the invention includes methods and apparatus for generating signals representative of differences between the number of charged particles collected by respective electrode sub-segments in a given electrode segment, and elements for applying the difference signals to compensate for vibration or changes in capacitance or electrical potential between the electrode segments and the electrically conductive sheet elements.

The invention further includes radiation detection methods and apparatus in which the ionizable medium is selected to have a nonlinearity in energy/efficiency response, which occurs at a different energy value than does a nonlinearity in the energy/efficiency response of the radiation source, so that detection response is energy-selective.

The invention will next be described in connection with certain illustrated embodiments; however, it should be clear to those skilled in the art that various modifications, additions and subtractions can be made without departing from the spirit or scope of the claims.

BRIEF DESCRIPTION OF THE DRAWINGS

For a fuller understanding of the nature and objects of the invention, reference should be made to the following detailed description and the accompanying drawings, in which.

DESCRIPTION OF PREFERRED EMBODIMENTS

Figure 1:
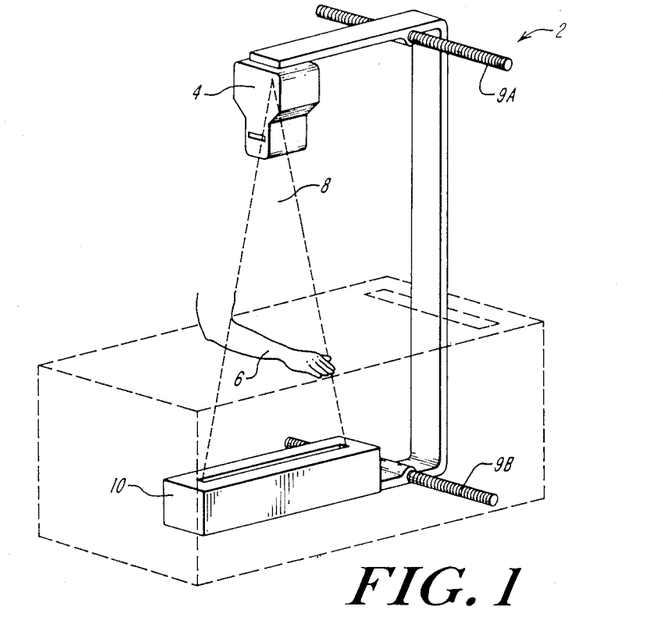
FIG. 1 depicts a bone densitometry system utilizing detector apparatus according to the invention.

FIG. 1 depicts a bone densitometry system 2 utilizing detector apparatus 10 according to the invention. The system includes a source 4 of ionizing radiation. The source 4 can be a conventional radioisotope or X-ray source, or can be an X-ray source constructed as described in commonly-owned U.S. Patent Application Ser. No. 321,989 filed Mar. 10, 1989 entitled "Source Filter for Radiographic Imaging" and incorporated herein by reference. The illustrated source 4 produces a substantially fan-shaped beam 8 of ionizing radiation which can be translated by conventional scanning means, such as worm drive elements 9A and 9B, across the region 6 of bone to be evaluated. The detector 10, constructed in accordance with the invention, detects and measures the energy distribution of the ionizing radiation transmitted through the measurement region 6, in a manner discussed hereinafter.

Figure 2A:
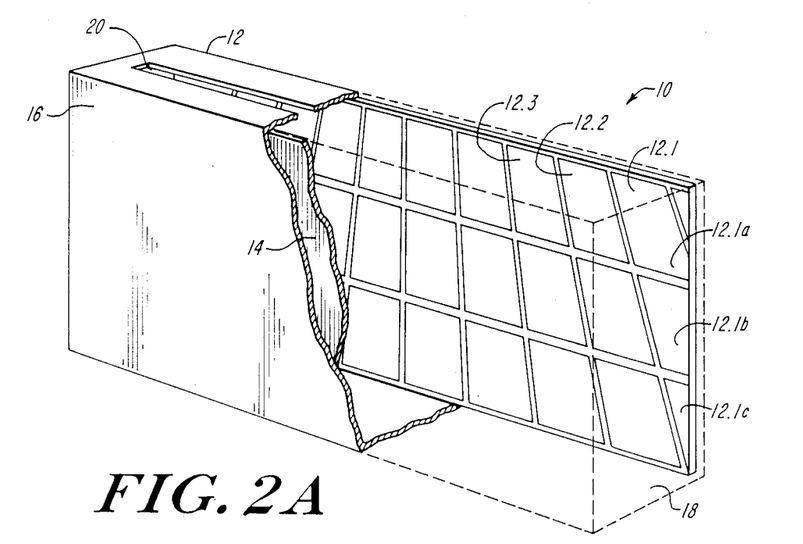
FIGS. 2A and 2B depict detector apparatus utilized in the embodiment of FIG. 1.
Figure 2B:
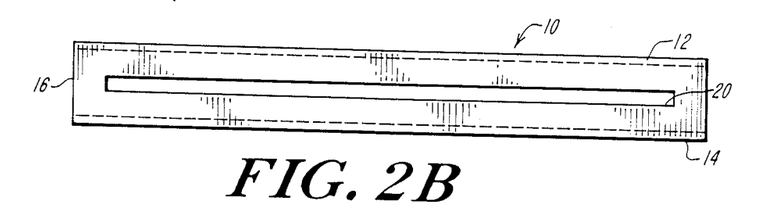
Figure 3:
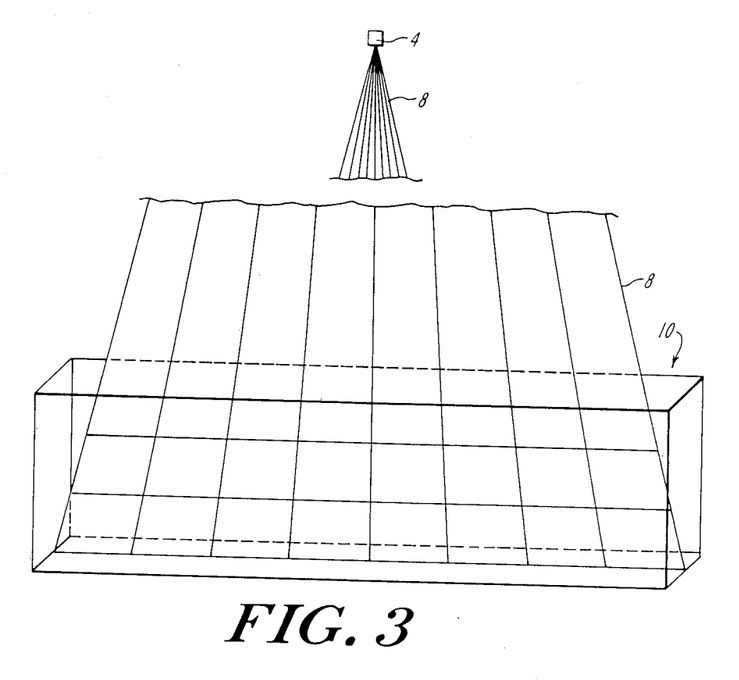
FIG. 3 depicts a radially segmented electrode set in accordance with the invention.

FIGS. 2A, 2B and 3 show an ionizing radiation detector 10 constructed in accordance with the invention. The ionizing radiation detector 10 includes an electrically conductive sheet 14 and an electrode assembly 12. The electrode assembly 12 is spaced apart from conductive sheet 14, and oriented substantially parallel to conductive sheet 14 and the plane of propagation of the ionizing radiation. An ionizable medium 18, such as a high pressure xenon gas mixture, is disposed between electrode assembly 12 and conductive sheet 14. The electrode assembly 12, conductive sheet 14, and ionizable medium 18 can be housed in an enclosure 16, which can be constructed of a suitable material such as aluminum, and can include an aperture or window 20 disposed in a source-facing surface, for admitting the ionizing radiation. The window 20 can be constructed of a material which can withstand the pressure of the ionizable medium 18 (such as xenon gas) contained in the enclosure 16, and which has a high coefficient of transmission of incident radiation. Materials such as aluminum or plastics may be employed in window 20.

In operation, a voltage source is connected to electrode assembly 12 and conductive sheet 14, and a potential difference is established between electrode assembly 12 and conductive sheet 14, so that electrons formed in the gas by the interaction of X-rays in the ionizable medium, such as high pressure xenon gas, are driven to the collection electrode assembly 12.

In accordance with the invention, as depicted in FIGS. 2A and 3, the electrode assembly 12 can be an electrically conductive sheet-like structure, divided by insulative strips substantially parallel to the direction of propagation of the radiation, to form a set of electrically discrete, electrically conductive electrode segments 12.1, 12.2, 12.3, . . . , 12.N. The electrode assembly 12 can be divided by insulative strips radially oriented toward the X-ray source 4, so that the major axis of each segment is oriented substantially toward the X-ray source 4, as depicted in FIG. 3. This configuration significantly reduces undesirable parallax effects which would otherwise arise from the finite thickness of the detector.

Each segment, in turn, can be divided by insulative strips substantially perpendicular to the direction of propagation of the radiation, to form a set of electrically discrete electrode sub-segments, such as 12.1a, 12.1b, and 12.1c, in a given segment, such as segment 12.1. The conductive and insulative regions defining these segments and sub-segments can be formed on a conventional printed circuit board.

Thus, the electrode assembly 12 of the invention is configured so that the electrode segment associated with each radial position is divided into two or more discrete electrode sub-segments. In the illustrated configuration, each electrode segment is divided into three sub-segments. Those skilled in the art will recognize that a greater or lesser number of sub-segments can be employed in accordance with the invention.

As a result of this segmented configuration, the ionization chamber responds selectively to different X-ray energies. Low energy X-rays are more likely to interact in the first electrode sub-segment regions—i.e., the portion of the detector closest to the radiation source—while the higher energy X-rays are more likely to interact in the second and third electrode sub-segment regions, exemplified in FIG. 4 by sub-segments 12.1b and 12.1c. The ionizable medium, such as xenon gas, behaves as a filter to remove the lower energy X-rays at greater depths in the detector.

Figure 4:
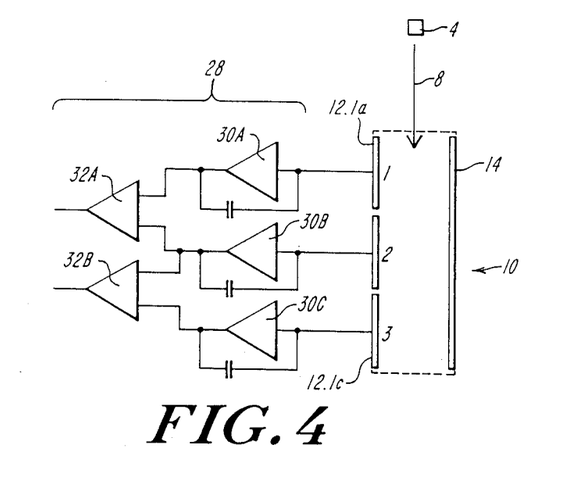
FIG. 4 is a schematic diagram depicting a differential amplifier configuration for processing signals generated by the detector apparatus.

In one embodiment of the invention illustrated in FIGS. 3 and 4, each of the two sub-segments closest to the source 4, exemplified by sub-segments 12.1a and 12.1b, are each 1 centimeters long in the radial direction. The third sub-segment 12.1c is typically at least two centimeters in the radial direction. The dimension of the electrode sub-segments in the angular direction can be approximately 1 mm. This distance establishes the spatial resolution of the detector system. The spacing between the electrode assembly 12 and the conductive sheet 14 can be 1 millimeter, and the space between the electrode assembly 12 and the conductive sheet 14 is filled with xenon gas to a pressure of at least 10 atmospheres. Additionally, the collection of electrons can be enhanced, in a known manner, by incorporating other gases, such as carbon dioxide, helium, or various hydrocarbons, in the ionizable medium.

The illustrated configuration 10 of detector cells has been found to be particularly efficient in detecting diverging X-ray beams 8 such as are produced from a single X-ray source 4, as shown in FIGS. 1 and 3. The illustrated detector measures the energy distribution of the incident X-rays, and significantly reduces the effects of mechanical vibration on the precision of the measurement process, in a manner discussed in greater detail hereinafter.

In this embodiment of the invention, for X-rays of energy above the K-edge of xenon which interact in the xenon, florescence X-rays of approximately 30 keV energy will be produced. The range of these florescence X-rays is typically greater than 1 centimeter. In conventional detectors, the configuration of the ionization chamber provided a relatively large solid angle through which the florescence X-rays could pass. Thus, in prior art detectors, these florescence X-rays interact in detection regions other than those corresponding to the original interaction event, thereby degrading the resolution attainable in such detectors. Conventional detectors necessitate separating the detector cells by a plurality of thin walls, which prevent the propagation of florescence X-rays from one cell to another. A significant feature of the present invention, in contrast, is that the dimensions of the cell are small and only a small number of florescence X-rays, typically less than 1%, interact in adjacent cells of the detector, due to the limited solid angle available to them. Thus, the invention eliminates the necessity of utilizing separator elements.

In one embodiment of the invention, illustrated in FIG. 4, the collection electrode assembly 12 is connected to output elements 28 for generating signals representative of the number of electrons collected by electrode sub-segments corresponding to each electrode segment. In particular, as depicted in FIG. 4, the electrode sub-segments, exemplified by sub-segments 12.1a, 12.1b, and 12.1c, are connected to conventional charge amplifier elements 30a, 30b, and 30c, respectively, which integrate the ionization current associated with each electrode sub-segment.

The output elements can also include difference amplifiers 32a and 32b, for generating a signal representative of the difference in the number of charged particles collected at each electrode sub-segment 12.1a, 12.1b, 12.1c corresponding to a given electrode segment 12.1. In particular, the amplifier outputs associated with the electrode sub-segments 12.1a and 12 1b, respectively—i.e., the sub-segments closest to the source 4—can be connected to difference amplifier 32a, which generates a difference signal representative of the difference between the two electrode signals. Similarly, the outputs of 12.1b and 12.1c can be connected to amplifier 32b.

While FIG. 4 depicts the utilization of difference amplifiers for determining the difference between the signal from different sub-segments of the detector, the difference can alternatively be computed by digital elements after the charge-representative signals are digitized by means of analog to digital convertors.

These differencing output elements can provide a number of significant advantages over the prior art. In particular, these output elements enable a determination of the energy distribution of the incident radiation. X-rays of varying energy levels incident upon the detector have different probabilities of interaction at a given depth in the detector. The lowest energy X-rays are most likely to interact in the regions of the detector closest to the source 4 illustrated in FIG. 4—i.e., those regions associated with the uppermost sub-segments, exemplified by sub-segment 12.1a. Higher energy X-rays will interact with approximately equal probability in the uppermost and intermediate-depth regions, and thus both electrode sub-segments 12.1a and 12.1b will collect similar numbers of ionization particles from high energy X-rays. Electrode sub-segment 12.1a, however, will collect more ionization particles from low energy X-rays than will sub-segment 12.1b. Accordingly, the difference function executed by amplifier 32a, representative of the difference in number of particles collected by sub-segment 12.1a and sub-segment 12.1b, will cancel out the high energy X-ray signals common to both, and the difference signal will be due only to the lower energy X-rays. BY adjusting the relative sizes of the electrodes, the effective spectrum of the final output signal can be adjusted.

Figure 4A:
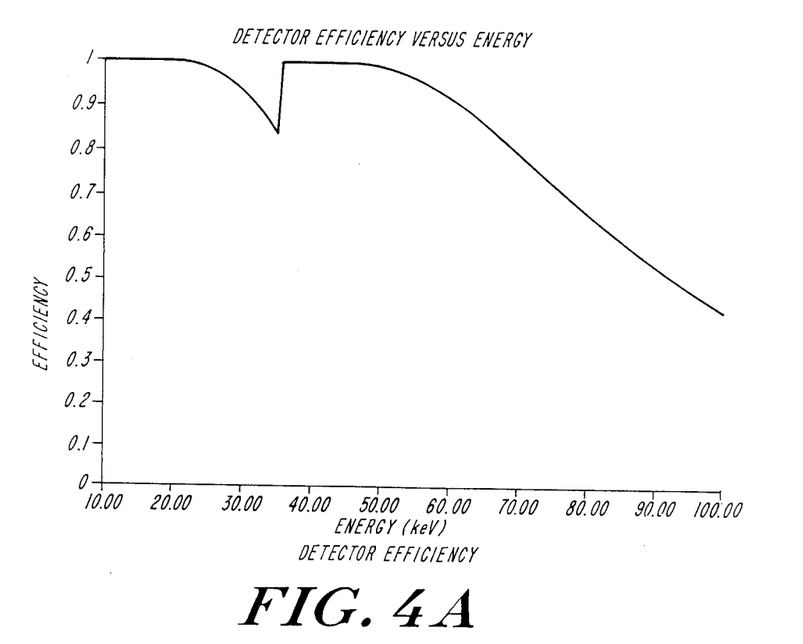
FIG. 4A is a graph depicting detector efficiency vs. energy for a detector utilizing xenon gas.
Figure 4B:
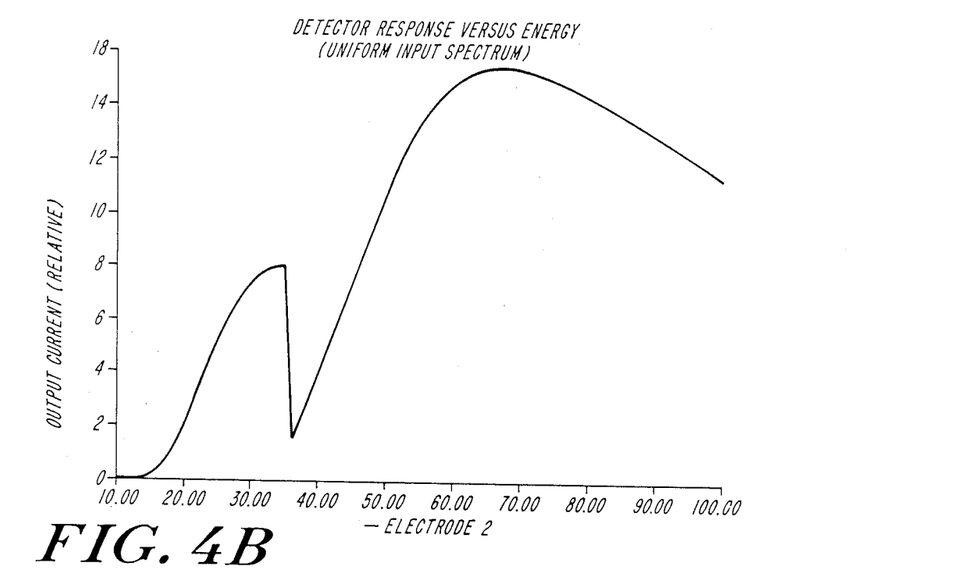
FIG. 4B depicts the output of electrode 2 with a uniform X-ray spectrum incident upon the detector.
Figure 4C:
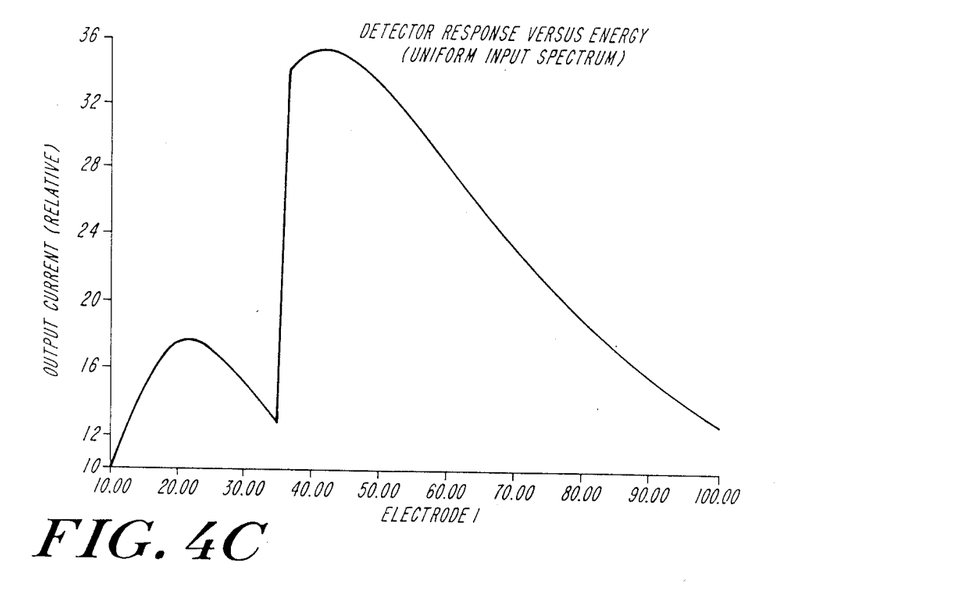
FIG. 4C depicts the output of electrode 1 with uniform X-ray spectrum incident.
Figure 4D:
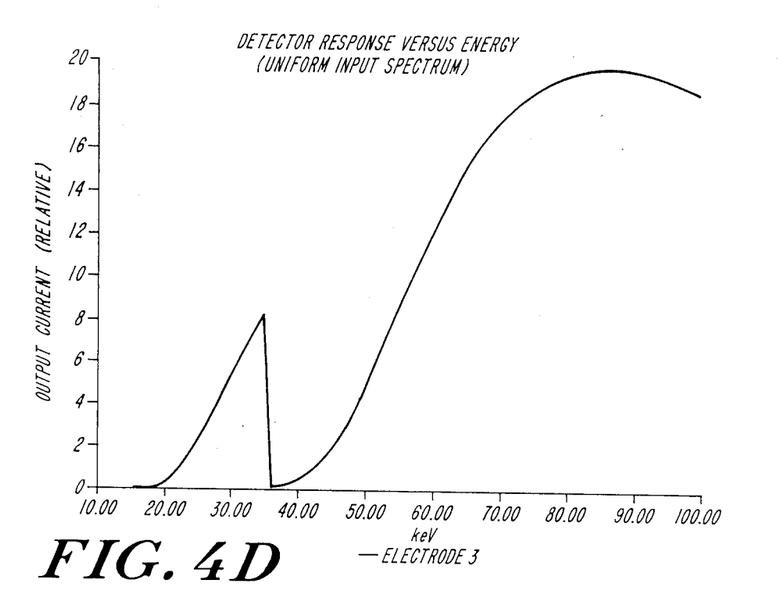
FIG. 4D depicts the output of electrode 3 with uniform X-ray spectrum incident.
Figure 4E:
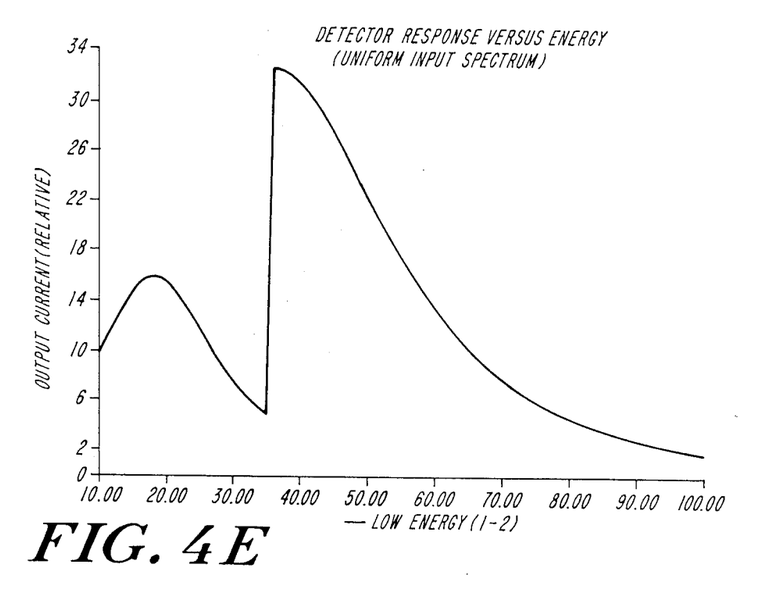
FIG. 4E depicts the difference signal generated by subtracting the output signal of electrode 2 from that of electrode 1 with a uniform X-ray spectrum incident.

The signals generated by the above-described output elements are illustrated in FIGS. 4a–4g. FIG. 4a depicts detector efficiency vs. energy for a detector constructed in accordance with the invention and utilizing xenon gas. FIGS. 4b and 4c, respectively, show the output signals from electrode sub-segments 12.1b and 12.1a for a uniform X-ray spectrum, while FIG. 4e shows the difference signal generated by difference amplifier 32a (FIG. 4) representative of the difference between particles collected on sub-segments 12.1a and 12.1b, respectively, and utilized to preferentially measure low energy X-rays.

In a preferred embodiment applicable to bone density measurements, the source of ionizing radiation can be an X-ray tube having a metallic filter element which enhances transmission of a particular part of the energy spectrum. X-ray sources of this type are described in commonly-owned U.S. Patent Application entitled "Source Filter for Radiographic Imaging" filed on even date herewith, and incorporated herein by reference. The present invention, having a selectable detector energy response, is advantageously practiced in combination with X-ray source filtering to produce a narrow source energy band. In particular, various metallic filter elements can be used to filter the output of an X-ray tube source to selectively absorb various parts of the spectrum.

Figure 4F:
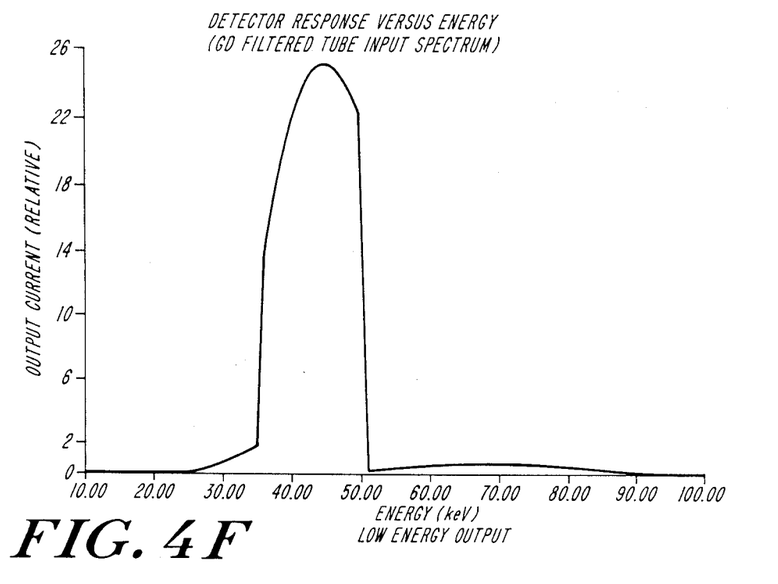
FIG. 4F depicts the difference signal of FIG. 4E, with a filtered input spectrum incident.
Figure 4G:
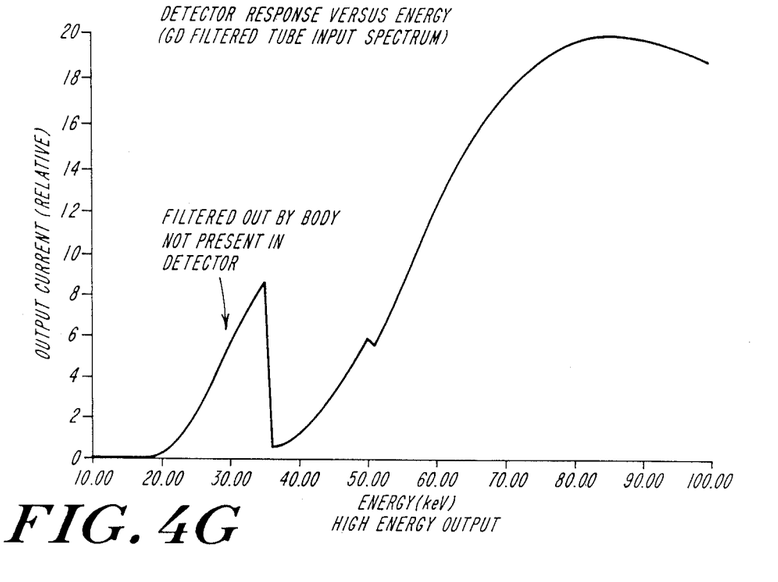
FIG. 4G depicts the output of electrode 3 with a filtered input spectrum incident.

FIG. 4F, for example, illustrates the difference signal generated by amplifier 32a when a 0.4 millimeter gadolinium foil is utilized in conjunction with a 100 kV X-ray source. The spectrum is sharply peaked at approximately 40–50 keV. Other filters can be employed, constructed from materials, such as cadmium or tin, having a K-edge just above the energy range which is to be emphasized. In this manner, the detector can selectively measure those X-rays transmitted through the body and within a particular energy range. Measurements of the relative transmission properties of the body at two different energies or with two different energy spectra can then be used in a known manner to distinguish the soft tissue and bone tissue equivalents of the body, and can be used to determine bone mass and other values. This dual energy technique, referred to as "dual photon absorptiometry", and the use of different spectra to measure the relative contributions of soft tissue and bone, is described in Chan et al, *IEEE Transactions on Nuclear Science,* Vol. NS-23 (1976).

A further advantage of the invention is the utilization of differential amplifier elements to reduce spurious signals introduced by mechanical motion of the plates—referred to as "microphonics"—or by changes in detector voltage or capacitance. A small change in electrode anode-cathode spacing will change the apparent capacitance of the detector electrode, resulting in a change in charge. A change in the voltage applied to the electrode will also produce a change in charge. The change in charge, dQ, is given by:

$$dQ = V\,dC + C\,dV$$

where V is the voltage applied across the detector electrodes and C is the capacitance. Factors dV and dC are small changes in voltage or capacitance. Capacitance is given by $$C = k\,A/S$$

where A is the area of the electrode and S is the spacing between the conductive sheet and the electrode assembly. The value of k is given by $$k = K\,e_0$$

where K is the dielectric constant of the medium between the electrodes, and $e_0 = 8.85 \times 10^{-12}$ Farad/meter. Thus, it is easily shown that $$dC/C = dS/S$$

and hence, the charge introduced by mechanical motion, which tends to change S, is given by:

$$dQ = VC\,dS/S$$

As a result of the configuration of the detector, the same charge component is introduced into both the first and the second sub-segment of each detector segment. Thus, when a difference function is executed, the spurious charge component is cancelled. Similarly, any change in voltage which would introduce a spurious charge is also cancelled.

Those skilled in the art will appreciate that the amplifier elements illustrated in FIG. 5 can be implemented in a multi-channel integrated circuit designed and constructed in accordance with known engineering practice. An integrated circuit of this type is marketed by Analytek Corp. of Sunnyvale, Calif. In particular, a single integrated circuit can incorporate a plurality of amplifier and charge integrators, and the outputs of respective charge amplifiers can be connected to an analog shift register. Successive clock pulses generated by a clock element shift the output of a given channel out to a single analog output. This embodiment significantly reduces the complexity and cost of electronics associated with the detector, and permits compact packaging of the detector. Such integrated circuits have not heretofore been employed for ionization detectors.

It will thus be seen that the invention efficiently attains the objects set forth above, among those made apparent from the preceding description. In particular, the invention provides a multi-electrode ionization detector which provides energy distribution information, and which reduces errors due to mechanical motion or voltage variations. The utilization of a radial geometry combined with a segmented electrode assembly reduces parallax effects. In addition, the detector material serves as an energy selective material to enhance the energy discriminating properties of the detector, especially when combined with an appropriately filtered X-ray source, and the parallel plane geometry reduces the interaction of florescence X-rays and resulting degradation in detector resolution. These advantages are especially apparent when the detector is applied to measurement of bone density.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. Apparatus for detecting ionizing radiation propagating from a radiation source, the apparatus comprising electrically conductive sheet means, connectable to a voltage source, for providing an electrical potential, electrode means, spaced apart from said electrically conductive sheet means, said electrode means being radially segmented in a first dimension substantially parallel to the direction of propagation of the ionizing radiation to form a plurality of electrically discrete electrode segments for collecting a number of charged particles present between said electrode means and said electrically conductive sheet means, and an ionizable medium, disposed between said electrode means and said electrically conductive sheet means, for absorbing the ionizing radiation and thereby generating energy, so that said charged particles are collected by respective electrode segments, in proportion to the absorbed radiation energy.

2. Apparatus according to claim 1, wherein said electrode segments are radial electrode segments having a major axis oriented substantially toward the radiation source.

3. Apparatus according to claim 1, wherein respective ones of said electrode segments include electrode sub-segments arranged in a second dimension, substantially perpendicular to the direction of propagation of the ionizing radiation.

4. Apparatus according to claim 3, further comprising output means, separately electrically connected to respective electrode sub-segments, for generating output signals representative of the number of charged particles collected on respective electrode sub-segments.

5. Apparatus according to claim 4, wherein said output means includes differential amplifier means for comparing output signals corresponding to electrode sub-segments in a given electrode segment, to measure energy distribution of the ionizing radiation.

6. Apparatus according to claim 4, wherein said output means includes amplifier means for amplifying charge signals representative of the number of charged particles collected on respective electrode sub-segments.

7. Apparatus according to claim 6, wherein said output means further includes
charge integrator means, for integrating charge signals corresponding to respective electrode sub-segments to generate integrated charge signals corresponding to respective electrode sub-segments.

8. Apparatus according to claim 7, wherein said output means further comprises
analog shift register means, including analog shift register elements corresponding to respective electrode segments, for serially storing and transmitting analog output signals corresponding to respective electrode sub-segments in respective electrode segments.

9. Apparatus according to claim 8, wherein said charge integrator means and said shift register means are elements of an integrated circuit.

10. Apparatus according to claim 4, wherein said output means includes
difference amplifier means, for generating difference signals representative of differences between the number of charged particles collected by respective electrode sub-segments in a given electrode segment, and
means for applying said difference signals to compensate for changes in any of capacitance or electrical potential between said electrode means and said electrically conductive sheet means.

11. Apparatus according to claim 1, wherein said ionizable medium is characterized by a selected nonlinearity in energy/efficiency response.

12. Apparatus according to claim 11, wherein said ionizable medium is xenon gas.

13. Apparatus according to claim 11, wherein said selected nonlinearity occurs at a different energy value than does a nonlinearity in energy/efficiency response of the radiation source, so that detection response is energy-selective.

14. Apparatus according to claim 3, wherein said electrode sub-segments are characterized by a size and collective configuration which reduces the solid angle through which the ionizing radiation can interact with said ionizable medium.

15. Apparatus according to claim 1, wherein said electrode segments are formed on a printed circuit board.

16. A method for detecting ionizing radiation propagating from a radiation source, the method comprising
radially segmenting an electrode in a first dimension substantially parallel to the direction of propagation of the ionizing radiation to form a plurality of electrically discrete electrode segments,
positioning said electrode in proximity to, and spaced apart from, an electrically conductive sheet,
connecting said electrically conductive sheet and said electrode to a voltage source, for providing an electrical potential therebetween, so that said electrode collects a number of charged particles present between said electrode and said electrically conductive sheet, and
disposing an ionizable medium between said electrode and said electrically conductive sheet, to absorb the ionizing radiation and thereby generate charged particles in proportion to the absorbed radiation energy, so that said charged particles are collected by respective electrode segments, in proportion to the absorbed radiation energy.

17. A method according to claim 16, wherein said segmenting step includes dividing said electrode into radial electrode segments having a major axis oriented substantially toward the radiation source.

18. A method according to claim 16, wherein said dividing step includes dividing said electrode segments into electrode sub-segments arranged in a second dimension, substantially perpendicular to the direction of propagation of the ionizing radiation.

19. A method according to claim 18, further comprising the step of generating output signals representative of the number of charged particles collected on respective electrode sub-segments.

20. A method according to claim 19, further comprising the step of comparing output signals corresponding to electrode sub-segments in a given electrode segment, to measure energy distribution of the ionizing radiation.

21. A method according to claim 19, further comprising the step of amplifying charge signals representative of the number of charged particles collected on respective electrode sub-segments.

22. A method according to claim 21, further comprising the step of integrating charge signals corresponding to respective electrode sub-segments to generate integrated charge signals corresponding to respective electrode sub-segments.

23. A method according to claim 22, further comprising the steps of serially storing and transmitting analog output signals corresponding to respective electrode sub-segments in respective electrode segments.

24. A method according to claim 23, further comprising the step of configuring an integrated circuit to perform said storing and transmitting steps.

25. A method according to claim 24, further comprising the steps of
generating difference signals representative of differences between the number of charged particles collected by respective electrode sub-segments in a given electrode segment, and
applying said difference signals to compensate for changes in any of capacitance or electrical potential between said electrode and said electrically conductive sheet.

26. A method according to claim 16, further comprising the step of selecting said ionizable medium to have a selected nonlinearity in energy/efficiency response.

27. A method according to claim 26, wherein said selecting step includes selecting said ionizable medium to include xenon gas.

28. A method according to claim 26, wherein said selecting step includes selecting said nonlinearity to occur at a different energy value than a nonlinearity in energy/efficiency response of the radiation source, so that detection response is energy-selective.

29. A method according to claim 28, wherein said dividing step includes the step of configuring said electrode sub-segments to reduce the solid angle through which the ionizing radiation can interact with said ionizable medium.

30. A method according to claim 16, further including the step of forming said electrode segments on a printed circuit board.

* * * * *